(No Model.) 4 Sheets—Sheet 3.
T. F. MORRIN & W. F. COSGROVE.
APPARATUS FOR MIXING AERIFORM FLUIDS.
No. 385,873. Patented July 10, 1888.
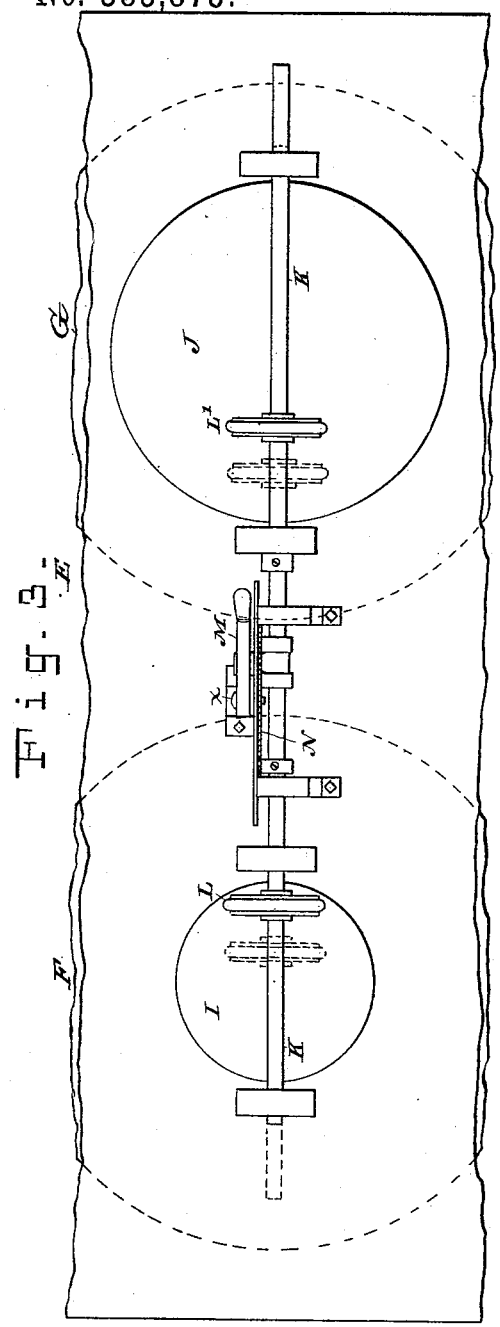
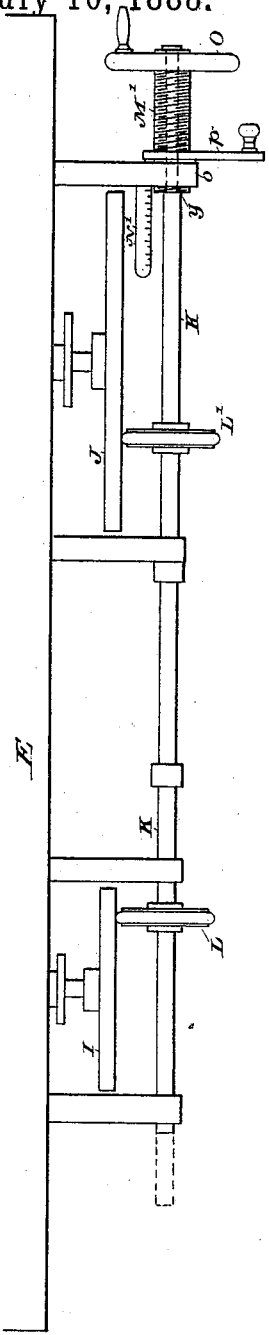
WITNESSES:
INVENTORS:

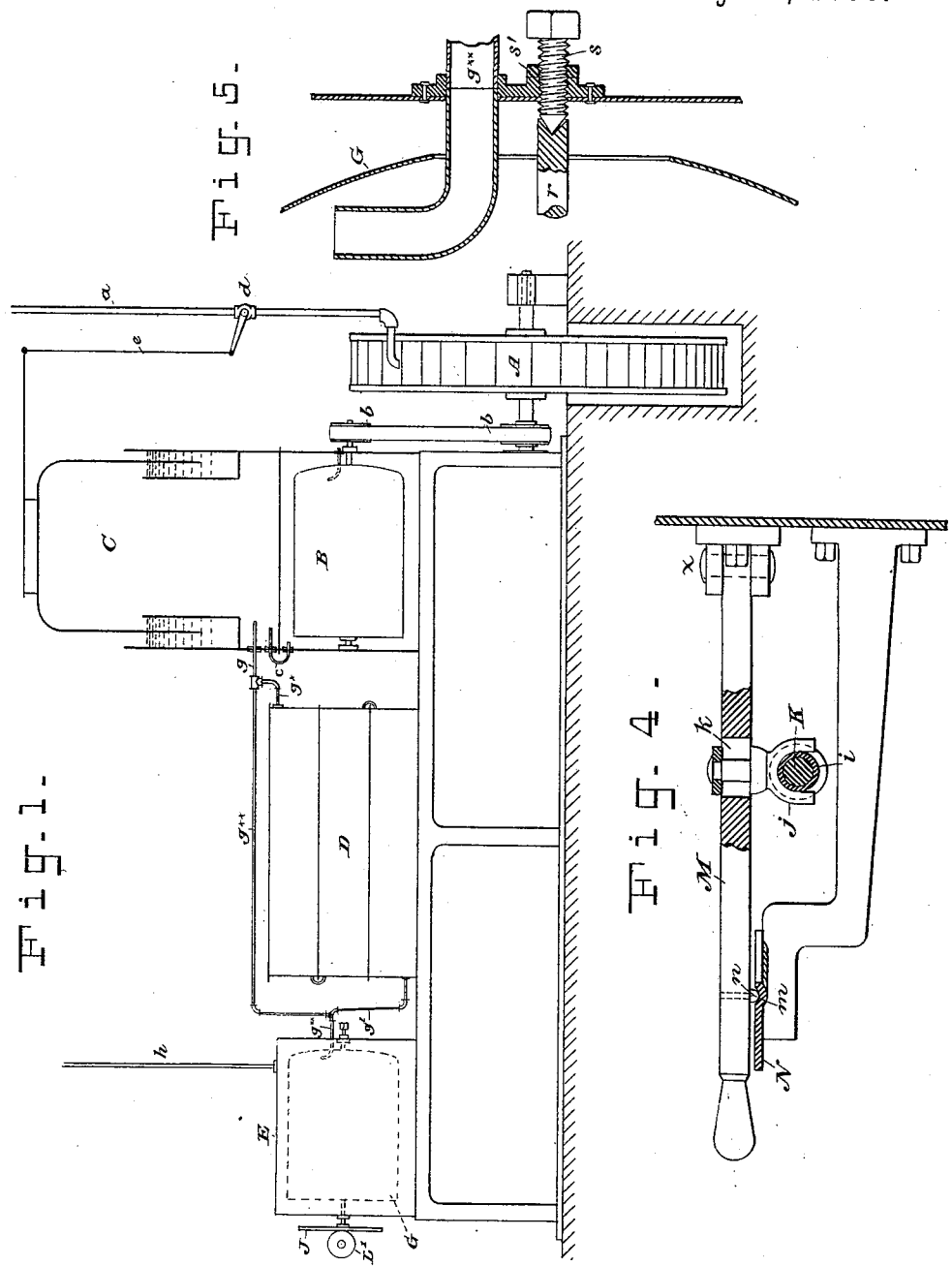

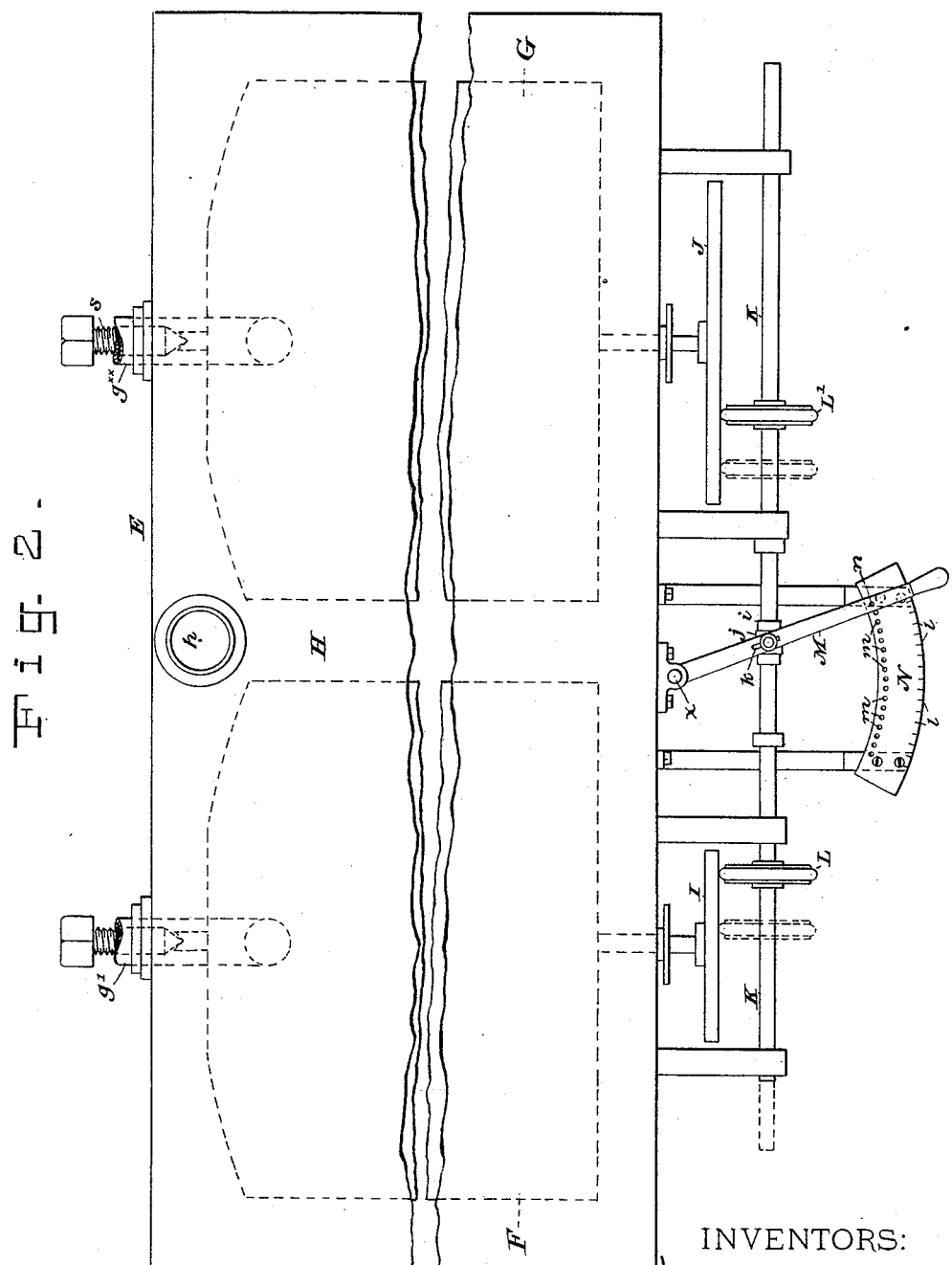

(No Model.) 4 Sheets—Sheet 4.
T. F. MORRIN & W. F. COSGROVE.
APPARATUS FOR MIXING AERIFORM FLUIDS.
No. 385,873. Patented July 10, 1888.
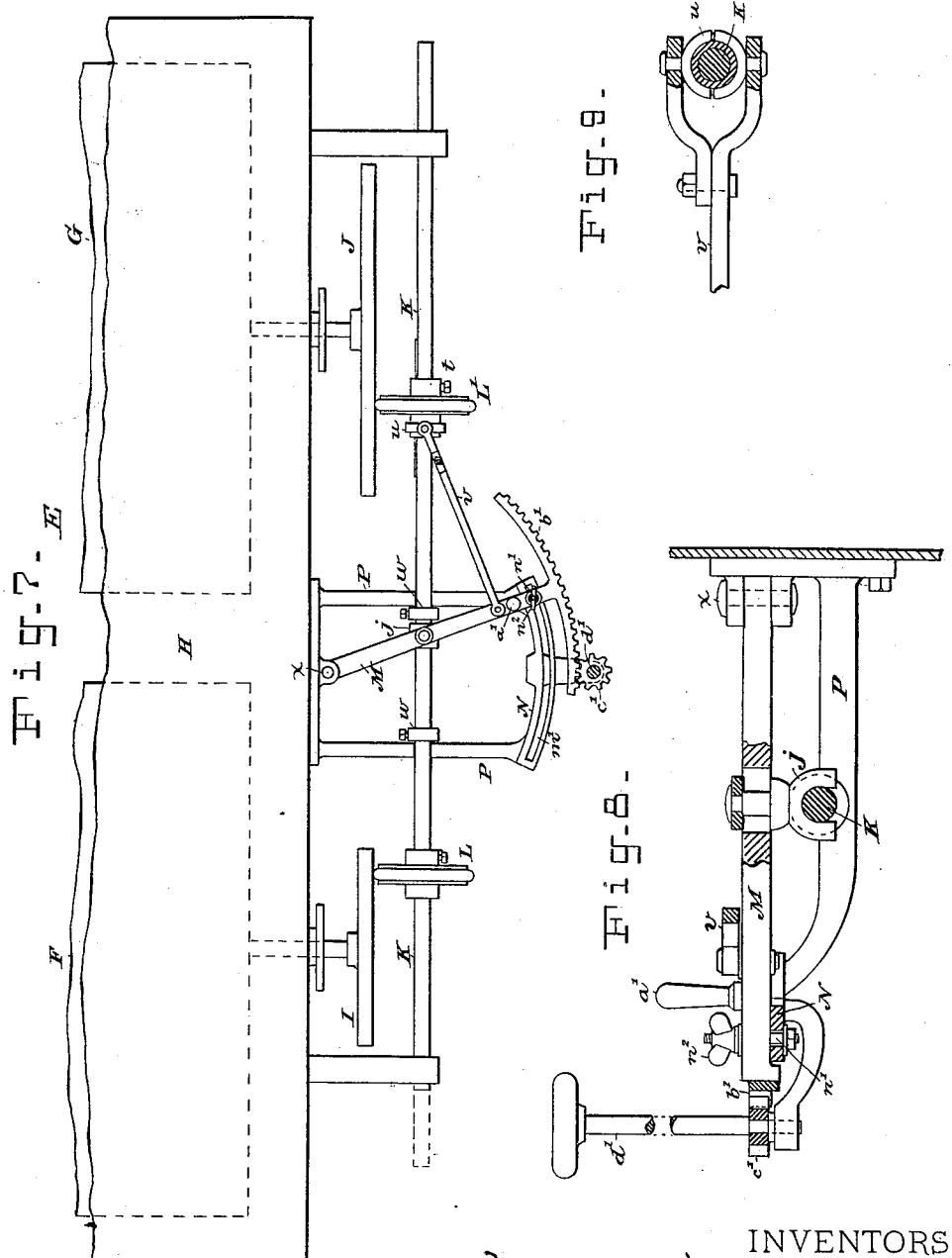
WITNESSES:
INVENTORS:
Thomas F. Morrin,
William F. Cosgrove,
By Henry Connett
Attorney.

UNITED STATES PATENT OFFICE.

THOMAS F. MORRIN AND WILLIAM F. COSGROVE, OF JERSEY CITY, NEW JERSEY.

APPARATUS FOR MIXING AERIFORM FLUIDS.

SPECIFICATION forming part of Letters Patent No. 385,873, dated July 10, 1888.

Application filed October 15, 1887. Serial No. 252,447. (No model.)

*To all whom it may concern:*

Be it known that we, THOMAS F. MORRIN and WILLIAM F. COSGROVE, both citizens of the United States, and residents of Jersey City, Hudson county, New Jersey, have invented certain Improvements in Apparatus for Mixing Aeriform Fluids, of which the following is a specification.

Our invention relates to that class of apparatus designed, primarily, for mixing air with the gas or vapor from a carburetor, in order to fit said vapor for illuminating purposes, wherein the air and the gas from the carburetor are led each to a meter, between which meters is a mixer into which both discharge, and from this mixer the properly-mixed gas and air is led to the burners. The meters are driven by the pressure derived from the aeriform fluids passing through them, and they are geared together in such a manner that their relative velocities may be varied from time to time as the gas or enriched air from the carburetor becomes impoverished.

The object of our invention is to provide the mixing-meters with a simple differential connecting-gearing, whereby their relative velocities may be varied in any extent required within limits and with the greatest degree of nicety and precision, and to provide means for taking up loosened or lost motion in said gearing when it shall have become worn from use.

Our invention will be fully described hereinafter, and its novel features carefully defined in the claims.

In the drawings which serve to illustrate our invention, Figure 1 is a general and somewhat diagrammatic view, on a small scale, designed to illustrate the entire carbureting apparatus and to aid in the fuller comprehension of the purposes of our invention. Fig. 2 is a plan, and Fig. 3 a front elevation, of the two mixing-meters provided with our improved differential connecting-gearing and shifting and adjusting mechanism. These views are drawn to a much larger scale than Fig. 1. Fig. 4 is a detached view of the shifting lever, showing it in side elevation and on a scale double that of Figs. 2 and 3. Fig. 5 is an enlarged detail view of the device for taking up the wear in the gearing. Fig. 6 is a plan view of the differential gearing similar to Fig. 2, illustrating a modified form of the shifting mechanism. Fig. 7 is a plan view similar to Figs. 2 and 6, illustrating another form of the shifter; and Figs. 8 and 9 illustrate details of this construction.

In Fig. 1 we have shown one form of a carbureting apparatus; but we make no claim to this as a whole, nor do we confine ourselves to the application of our improvement to an apparatus of this kind. They may be applied to any apparatus where a mixer having two revolving meters is employed. In this apparatus $a$ is a pipe which supplies water under a head to an overshot wheel, A. This may in some cases be waste water and in part water from a reservoir supplied from the service-pipe. This overshot wheel communicates rotary motion through a belt and pulleys or other gearing, $b$, to a rotary meter-pump, B. This latter is in common use and will need no description. This pump B forces air into a holder or reservoir, C, the bell of which has its margin sealed in liquid in the manner of an ordinary gas-holder.

$c$ is the pipe leading from the pump B to the reservoir C. The bell of the reservoir C controls a cock, $d$, in the water-pipe $a$ through the medium of a shifter, $e$, so that when the bell shall have risen to a predetermined height it will close said cock and shut the water off from the wheel A, and when it shall have descended to a predetermined point it will open said cock.

Air is taken from reservoir C under a pressure due to the weight of the bell through a pipe, $g$, one branch, $g^\times$, from which leads to a carburetor, D, (which may be of any approved kind,) and the other branch, $g^{\times\times}$, of which leads to one of the meters in the mixing apparatus E. A pipe, $g'$, leads from the carburetor D to the other meter in the mixing apparatus. A pipe, $h$, leads the properly-mixed atmospheric air and hydrocarbureted air or gas (from the carburetor) to the burners.

The above description will enable the general construction of the carbureting apparatus to be understood; but we have not attempted to show in Fig. 1 all the various details of construction.

Referring, now, to Figs. 2, 3, 4, and 5, we will explain more fully and clearly the construction and operation of the mixing apparatus E and the construction of our improvements and their application to said mixing apparatus. The mixing apparatus comprises two meters, or meter-wheels, inclosed in a casing, (or in separate casings,) with their delivery ends open to or in communication with a mixing-chamber, from which the mixed fluids are led by a pipe to the burners.

In Figs. 2 and 3, F is a meter which receives hydrocarbureted air, commonly called "gas," from the carburetor D through pipe $g'$, and G is the meter, which receives air from reservoir C through pipe $g^{\times\times}$. The respective fluids pass through and rotate the meters F and G and then flow into the mixer or mixing-chamber H, which, as here shown, is within the casing and between the meters. This is a well-known form of mixing apparatus and will need no further description here. The object of mixing air with the gas from the carburetor or generator is, of course, to dilute it, as it is too rich in hydrocarbon, and especially so after the generator has been freshly charged; but the gas constantly diminishes in richness as the vaporized hydrocarbon is carried away by the air passing through the carburetor, and it is necessary in order to maintain an approximately uniform degree of richness of the gas supplied to the burners to reduce from time to time as the hydrocarbon in the generator wastes away the amount of air supplied to the mixing-chamber H by the meter G. This is effected by coupling the shafts of the two meters F and G together by gearing and providing means for shifting or setting this gearing so as to vary the relative velocities of the two meters. Our improved gearing and shifting device for this purpose will now be described.

On the axis of meter F is a plane-faced disk, I, and on the axis of the meter G is a similar (but usually larger) disk, J. On a shaft, K, mounted in bearings, so as to extend diametrically across the faces of disks I J, are mounted two friction-wheels, L and L′, which press peripherally against the faces, respectively, of disks I and J. The shaft K is mounted to slide longitudinally in its bearings, and when it is moved in this manner one of the friction-wheels is moved inward toward the axis of the disk on which it bears, while the other is moved outward or away from the axis of this disk. Thus, when the friction-wheels stand as indicated in Figs. 2 and 3, both will be at the same distance from the axis of their respective disks and the meters will be speeded alike; but if the shaft be moved endwise, as to the left in Fig. 2, wheel L will be moved toward and nearer to the axis of its disk I, and wheel L′ will be moved an equal distance radially from the axis of its disk J. Under these conditions the meters will rotate at speeds differing directly as the radial distances of wheels L L′ from the axes or centers of their respective disks, and as one of these radial distances will have been reduced to the same extent that the other will have been increased, it follows that a very slight endwise movement of shaft K will effect a considerable variation in the relative speeds of the meters. Moreover, the variation in speed that may be effected is not limited to one of predetermined steps. It may be effected in any way desired and while the meters are in operation.

We may employ various means for shifting the shaft K endwise for varying the speeds of the meters. For example, that illustrated in Figs. 2, 3, and 4 comprises a grooved collar, $i$, on shaft K, which is engaged by a fork, $j$, swiveled in a slot, $k$, in a shifting lever, M, fulcrumed at $x$ on the casing containing the meters. By swinging lever M laterally from side to side, a longitudinally-reciprocating motion may be imparted to the shaft K. The slot $k$ in the lever permits of the necessary movement of the neck or journal of the fork $j$ in said lever, and the swiveling of the fork in the lever permits it to fit snugly in the groove in collar $i$ in whatever position the lever may happen to stand.

In order to enable the lever to be moved to the proper extent to produce certain relative speeds in the meters, and in order, also, to provide a holdfast for it, so that when once set it will remain in that position, a plate, N, is arranged under it, and on this plate graduation-marks $l$ are provided. These may be spaced in any way that will best suit the conditions required, and they may have numerals to indicate, for example, the relative speeds of the meters, the percentage of air being supplied to the mixing-chamber, or the number of days that should elapse after charging the generator before the lever is to be moved to that particular graduation-mark.

In the face of plate N are numerous recesses or holes, $m\ m$, arranged in a curved line concentric with fulcrum $x$, and on the lower face of the lever M is a small short stud, $n$, in position to engage said recesses. This stud has by preference a rounded end, so that it may readily slip into the recesses, and thus hold the lever against accidental movement; but the spring of the lever and the slight looseness or play at its fulcrum will allow it to be lifted high enough to raise the stud $n$ clear of the recess $m$, and thus permit the lever to be shifted.

In Fig. 6 we have shown another form of device for shifting or moving the shaft K endwise. In this construction the shaft has a shoulder, $y$, near its end, against which abuts the end of a screw-threaded sleeve, M′, which screws through one of the bearings $o$ of the shaft and embraces said shaft. The shaft projects through the outer end of the sleeve, and has a head or nut thereat to keep the sleeve in its place on the shaft. The sleeve has a handle or hand-wheel, O, by which it is rotated, and a jam-nut, P. The shaft is moved longitudinally by screwing the sleeve in or out, as will be understood. A plate, N′, with suitable graduation marks thereon, may be provided to indicate the distance the shaft may have been moved, the shoulder $y$ or end of the sleeve serving as an index or pointer.

As the friction-wheels L L' (which we have shown provided with rubber tires or faces) will wear away in time, we provide for adjusting the disks up to them. The device we employ for this purpose is best illustrated in Fig. 5, which is a sectional view of the bearing at the end of meter G opposite to that where the disk J is mounted. The journal $r$ of the meter at this end is provided with a conical recess to receive the conical tip of an adjusting-screw, $s$, which screws through a bearing-plate on the casing of the meter and is provided with a jam-nut, $s'$. The other journal of the meter, on which disk J is mounted, may play endwise for a limited distance through its bearing, and therefore by means of screw $s$ the meter, its journal, and the disk J may be moved endwise all together in a manner to keep the latter always in proper frictional contact with wheel L'. The other meter, F, is provided with the same kind of adjusting device as that just described; but it will be unnecessary to more particularly describe it.

In Figs. 7, 8, and 9 we have illustrated a form of our invention wherein one of the friction-wheels, as L', may be shifted independently of the other friction-wheel and of the shaft K, or, if desired, both of said wheels and the shaft may be shifted simultaneously, as previously described with reference to the constructions shown in Figs. 2 and 6. The present construction also provides for effecting the shifting from the floor above when the mixing apparatus is placed in the cellar, as it usually will be. The disks I and J and the shaft K are arranged as before described, and the lever M is fulcrumed in the same manner and provided with a fork, $j$, which is swiveled in it and embraces shaft K. The wheel L is secured to the shaft, and the wheel L' is splined on the shaft K, but provided with a set-screw, $t$, whereby it may be secured to the shaft, if desired. The boss of the wheel L' is provided with a circumferential groove, which is engaged by a divided collar, $u$. (Seen best in Fig. 9, which is a detached side view of this device on a scale double that of Fig. 7.) To this collar $u$ is pivoted the forked end of a connecting-rod, $v$, the other end of which is coupled to lever M. Two set-collars, $w$ $w$, on the shaft K are set up to projecting supports P P, and thus serve to prevent endwise movement of shaft K. Vibration of lever M acts through rod $v$ to shift the friction-wheel L' radially over the face of disk J, and thus effect the desired change in the relative velocities of the meter-wheels F and G; but by setting collars $w$ $w$ up to fork $j$, on lever M, so as to embrace said fork, and setting wheel L' fast on shaft K by set-screw $t$ and removing rod $v$ the device may be made to operate as that before described, wherein the shaft and both friction-wheels move in unison.

The supports P P may have in them bearings for shafts K, and they support at their ends a plate, N, over which the lever M plays. In this plate N is a curved slot, $m'$, and a clamp screw, $n'$, passes through this slot and the lever and has a nut, $n^2$, on its end. This nut and screw enable the lever M to be clamped fast to plate N in any position in which it may be placed. The lever has or may have an operating-handle, $a'$. This construction is best illustrated in Fig. 8, which represents the lever in side elevation (similar to Fig. 4) and is drawn to a scale double that of Fig. 7.

The mixer E is usually placed in the cellar, and it may be desirable in some cases to operate the lever M from the floor above. To this end we mount on the end of lever M a curved rack, $b'$, and arrange it to mesh with a pinion, $c'$, fixed on an upright shaft, $d'$, which may extend up to any point and have a hand-wheel on its upper end for convenience in rotating the pinion and, through it and the rack, shifting lever M. When the rack-and-pinion device is used, the clamping-nut $n^2$ will of course be loosened.

Having thus described our invention, we claim—

1. In a gas apparatus, the combination of two meter-wheels, one of which is connected with the gas conduit or pipe from the generator and the other provided with an air-supply, of adjustable differential gearing connecting said meter-wheels, whereby their relative velocities may be changed at will, said gearing consisting of two plane-faced disks mounted, respectively, on the journals or shafts of the two meter-wheels, a shaft extending across the faces of said disks, and two friction-wheels on said shaft, with their peripheries in contact, respectively, with the faces of said disks, whereby the shifting of either or both of said wheels over the face of the disk will vary the relative velocities of the meter-wheels, as set forth.

2. In a gas apparatus, the combination, with two meter-wheels, as F and G, in the mixer E, of the disks, as I and J, on the respective shafts of the said meter-wheels, the shaft, as K, extending diametrically across and in front of said disks, the friction-wheels, as L and L', on shaft K and in contact peripherally with the respective faces of the disks, and a shifter for shifting said gearing, substantially as set forth.

3. In a gas apparatus, the combination, with the two meter-wheels, of the mixer, the two disks on the respective shafts of said meter-wheels, the shaft K, and the friction-wheels on said shaft in contact peripherally with the faces of the respective disks, of the shifter whereby the gearing is shifted, and the holder whereby the shifter is held in the position set.

4. In a gas apparatus, the combination, with the two meter-wheels, of the mixing apparatus and the plane-faced disks on their respective journals, of a shaft, as K, a friction-wheel, as L, on said shaft and in peripheral contact with one of said disk, a friction-wheel, as L', on said shaft and in contact peripherally with the other disk, said wheel being movable in a plane parallel with its axis, and a shifter for said wheel, comprising a lever, M, the collar $u$ on the boss of the wheel L', the rod $v$, connecting the said collar and lever, the slotted plate N, the clamp-screw $n'$ in said lever and plate, and its nut, the said screw and nut forming a holder for the lever, as set forth.

5. In a gas apparatus, the combination, with the two meter-wheels, of the mixing apparatus, the differential friction-gearing connecting said meter-wheels, and the shifting lever, as M, of the curved rack on said lever, the upright shaft $d'$, and the pinion $c'$ on said shaft and meshing with said rack, as set forth.

In witness whereof we have hereunto signed our names in the presence of two subscribing witnesses.

THOMAS F. MORRIN.
WILLIAM F. COSGROVE.

Witnesses:
HENRY CONNETT,
J. D. CAPLINGER.